United States Patent [19]

Vizireanu et al.

[11] Patent Number: 5,625,570

[45] Date of Patent: Apr. 29, 1997

[54] METHOD AND SYSTEM FOR INSERTING INDIVIDUALIZED AUDIO SEGMENTS INTO PRERECORDED VIDEO MEDIA

[75] Inventors: Ion Vizireanu, Thousand Oaks; Wyman G. Dunford, Camarillo; Michael A. Sterling, Woodland Hills; Alexander L. Meszaros, Tarzana; Miguel A. Abaunza, Moorpark, all of Calif.; Curtis Caloia, Redford; James W. Hussey, Canton, both of Mich.

[73] Assignee: Technicolor Videocassette, Inc., Camarillo, Calif.

[21] Appl. No.: 255,185

[22] Filed: Jun. 7, 1994

[51] Int. Cl.⁶ .................................................. G11B 27/022
[52] U.S. Cl. ............................. 364/514 A; 386/96
[58] Field of Search .................. 364/514 A; 360/14.3, 360/13, 18, 19.1; 358/343

[56] References Cited

U.S. PATENT DOCUMENTS

| | | | |
|---|---|---|---|
| 4,067,049 | 1/1978 | Kelly et al. | 360/14 |
| 4,428,001 | 1/1984 | Yamamura et al. | 358/335 |
| 4,479,150 | 10/1984 | Ilmer et al. | 358/310 |
| 4,499,503 | 2/1985 | Suzuki | 358/316 |
| 4,516,166 | 5/1985 | Tellone | 360/72.1 |
| 4,532,502 | 7/1985 | Menezes et al. | 340/717 |
| 4,743,981 | 5/1988 | Spencer et al. | 360/15 |
| 4,746,994 | 5/1988 | Ettlinger | 360/13 |
| 4,768,106 | 8/1988 | Ito et al. | 360/14.1 |
| 4,802,023 | 1/1989 | Williams | 360/14.3 |
| 4,819,087 | 4/1989 | Takeuchi et al. | 360/14.3 |
| 4,837,638 | 6/1989 | Fullwood | 360/14.2 |
| 4,903,148 | 2/1990 | Amano et al. | 360/13 |
| 4,905,094 | 2/1990 | Pocock et al. | 358/342 |
| 5,023,707 | 6/1991 | Briggs | 358/343 |
| 5,099,422 | 3/1992 | Foresman et al. | 364/401 |
| 5,227,892 | 7/1993 | Lince | 358/335 |
| 5,289,288 | 2/1994 | Silverman et al. | 358/335 |
| 5,315,445 | 5/1994 | Fukimoto et al. | 360/19.1 |

OTHER PUBLICATIONS

Sony Corp., "New Sony Betacam Sp Family Offers Affordable Component Video Recording", Dec. 1993.

Primary Examiner—Ellis B. Ramirez
Assistant Examiner—Patrick J. Assouad
Attorney, Agent, or Firm—Lyon & Lyon

[57] ABSTRACT

A method and related system are disclosed which allow for a series of individualized audio segments to be recorded for subsequent, simultaneous insertion into the audio track(s) of a plurality of videotapes loaded into multiple videotape recorders (VTR's), respectively. In one embodiment, each audio segment recorded is uniquely associated with, and inserted into, an audio track of a respective prerecorded videotape such that each of the plurality of videotapes is personalized with its own unique message. A voice recording and data entry station is provided wherein each audio segment to be inserted is independently recorded, digitized, and stored on a data tape with related identifying information associated therewith. Audio segments from the digital data tape are then downloaded in groups into a production control center computer, incorporating software and interface circuitry to control the operation of the VTR's, in order to effect the insertion of each audio message segment into respective videotapes. The production control center may further cause labels to be printed which may subsequently be affixed to particular videotapes. Such labels may identify the ultimate recipient of a particular personalized videotape and the respective videotape within the plurality of VTR's into which that recipients individualized audio segment has been inserted.

34 Claims, 8 Drawing Sheets

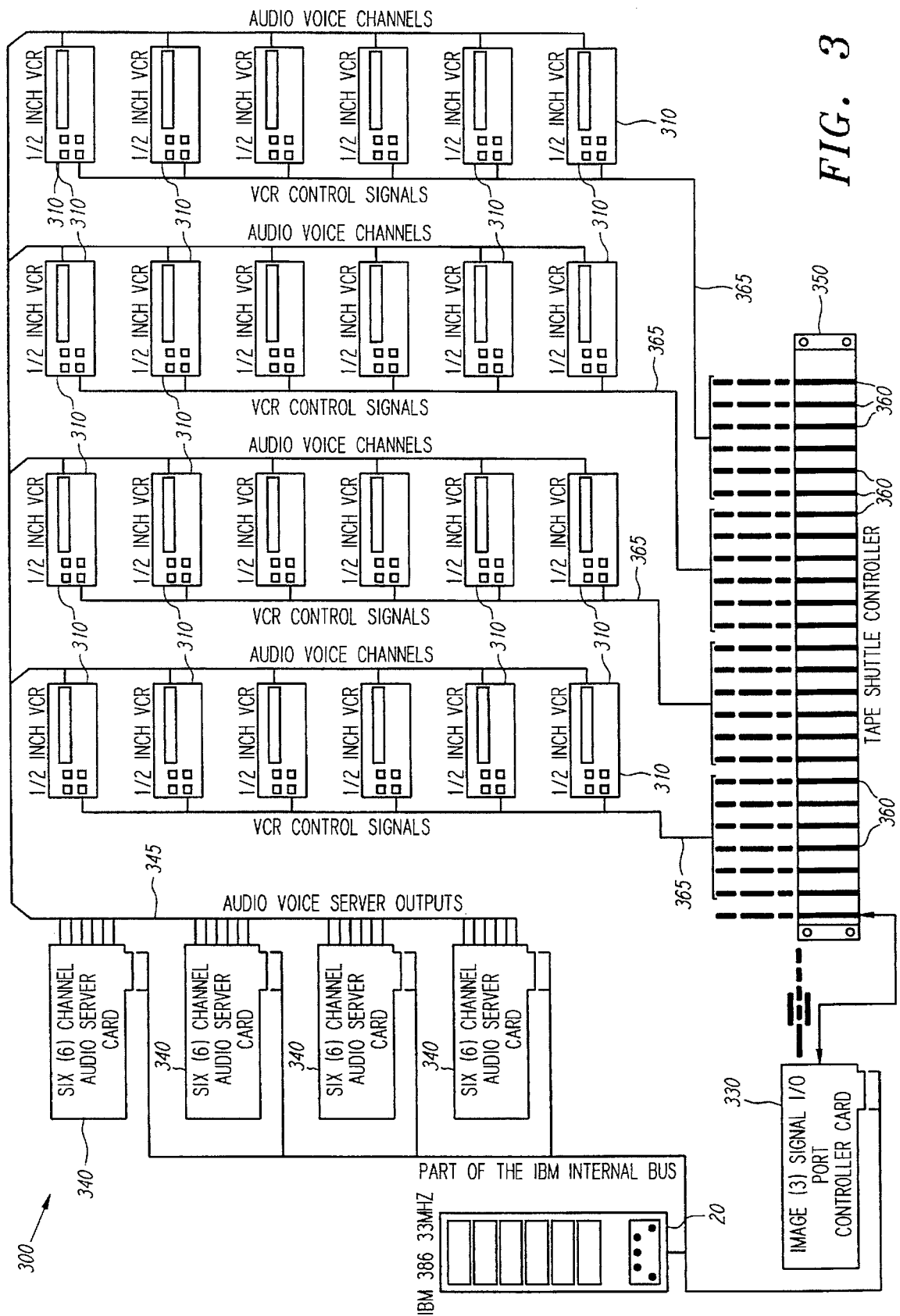

METHOD AND SYSTEM FOR INSERTING INDIVIDUALIZED AUDIO SEGMENTS INTO PRERECORDED VIDEO MEDIA

FIELD OF THE INVENTION

The field of the present invention relates generally to video media and, more particularly, to a method and system for accurately inserting each of a plurality of individualized audio segments, respectively, into a plurality of prerecorded video media at a precise, predefined position.

BACKGROUND OF THE INVENTION

Advances in video technologies, including mass reproduction of prerecorded videotapes, along with the increasing popularity of videotape machines for home and business use, have made videotape an attractive alternative for disseminating a wide variety of information. The resulting desire to utilize video media in an increasing array of applications has, in turn, helped to spawn interest in developing further video technologies, such as digital videotapes and compact disk video variants. Impending advances in these areas are also focussed, at least in part, on the aspect of efficiencies in the mass reproduction of prerecorded materials.

In large part, the attractiveness of videotape, and other video materials, as a medium for information dissemination results from decreasing costs attendant with the above factors. However, the cost savings that have been realized are mainly due to efficiencies in reproduction methods, and the ability to spread costs over higher product volumes due to the increased demand. As the bulk of the cost associated with the production of video materials is incurred in the original creation (e.g., filming, etc.) and preparation of a master tape used for reproduction of copies, it can still be cost-prohibitive to utilize video media in low-volume applications.

In particular, while it may be desirable to use prerecorded video materials, e.g., videotape, to deliver information, entertainment, messages, or other such matter targeted to a particular individual or small group of individuals, the costs associated with the preparation of such low-volume materials have heretofore made this approach impractical. In order to alleviate this situation, there exists a need for a method and system for producing "personalized" video materials, i.e., videotapes, or the like, which are individually tailored to a person, a small group of people, an entity, or other such low-volume application, but which still take advantage of reduced costs resulting from high-volume reproduction techniques and the economies of scale associated therewith.

SUMMARY OF THE INVENTION

A cost-effective method and system for personalizing video materials is provided herein. A preferred embodiment of such a method and system is directed to inserting individualized audio segments, each of which may, for example, comprise a spoken message of certain duration (e.g., 30 seconds) and which may be directed specifically to an entity (e.g., by name), into an audio track of respective prerecorded videotapes at a predefined position within each tape. Each such audio segment may replace existing audio information, if present, on the respective videotape into which it is inserted. In a further aspect of a preferred embodiment, each such prerecorded videotape is otherwise identical (i.e., reproductions of the same material made according to well known videotape reproduction methods) and the respective individualized audio segment for each videotape is inserted at the same predefined position on each videotape simultaneously.

In order to effect the above results, a preferred embodiment includes a method and system for accumulating each of the individualized audio segments to be inserted into respective prerecorded videotapes and a method and system for simultaneously inserting each individualized audio segment into respective prerecorded videotapes at predefined positions therein.

In greater detail, individualized audio segments may be accumulated either by direct recording, e.g., via a microphone connected to the system, or may be supplied from a third party, e.g., on standard audiotape(s) or any other audio recording medium, to a system operator. For reasons which are related, in part, to increased capacity, audio segments so provided, which are analog in nature, are preferably digitized prior to storage. In addition, identification (ID) data may be entered into the system for each individualized audio segment. Such ID data may serve to identify that particular audio segment, may be used to control the flow of that audio segment throughout the system, and may be used to keep track of the videotape into which that particular audio segment has been inserted. For such purposes, the ID data is stored in conjunction with the audio segment identified thereby.

Once all of the desired audio segments for a particular application have been accumulated (or when the capacity of the particular storage medium in which the audio segments are being accumulated, e.g., digital data tape, has been reached), the insertion of audio segments into respective videotapes may commence. In a preferred embodiment, the accumulation of audio segments and their insertion into respective videotapes are performed by independent subsystems. Accordingly, during the insertion stage, the recording subsystem is available to begin accumulating audio segments for a different application, or to continue accumulating additional audio segments for the same application.

With respect to the insertion stage, groups of stored, digitized audio segments and their respective, associated ID data are retrieved into memory of a production control computer, such as by downloading, e.g., from a digital data tape, a number of audio segments corresponding to the number of Video Tape Recorder (VTR) units connected to the system for personalization of videotapes. The production control computer, which serves to control the production process, associates each audio segment to be inserted with a VTR connected within the system (such as by numeric reference assigned to each VTR) and into which a videotape to be personalized is loaded. A VTR control card, interfaced between the computer and each VTR, provides status information for, and independent control of, each VTR.

In conjunction with the computer, the control card operates to determine that each VTR unit is properly loaded with a videotape. Further, the control card causes each VTR unit that has a videotape loaded therein to advance that videotape to an insertion point identified according to known time code schemes familiar to the videotape field, and as entered by the operator. The insertion point may, for example, be reached by signalling the VTR units to operate in fast forward mode until a point in time just prior to the insertion point; at such time, each VTR unit could be signalled to revert to normal play speed in order to approach the desired time code with greater assurance of accuracy. Alternatively, use of fast forward mode operation may be bypassed and, instead, each VTR unit may be signalled to advance its respective videotape at normal play speed alone until reaching the desired insertion point. This latter mode of operating may be particularly appropriate in circumstances wherein the location of the insertion position is early on in the videotape to be personalized.

Any VTR units which, for any reason, fail to be properly controllable (e.g., are not loaded, are inoperative, or otherwise do not reach the desired time code position within prescribed time limits) are excluded from that insertion stage. Furthermore, any videotapes loaded into such excluded VTR units may be ejected and corresponding audio segments which had been associated with such VTR units retained for insertion in a later stage (e.g., with the next group of audio segments). Once each remaining videotape is properly positioned for insertion, the respective VTR units are placed in an audio dub mode and each audio segment to be inserted is sent, simultaneously, to the respective VTR unit with which the system has previously associated it. Accordingly, each audio segment is inserted into an audio track of a respective videotape.

Upon completion of insertion, each VTR unit ejects the videotape loaded therein which has been "personalized" with an individualized audio segment. A label may then be printed which identifies the audio segment (such as by printing the associated ID data therefor) and the videotape into which it has been inserted (such as by printing the numeric reference of the VTR into which that videotape was loaded). Each label may then be attached to the respective videotape to be shipped according to prearranged agreement. The system may then download another group of audio segments from the same digital data tape if additional audio segments are contained thereon for insertion. The insertion process is then repeated with these additional audio segments, and any audio segments retained based on previous exclusion of VTR units, in the same manner as above. Such operation continues until all audio segments accumulated have been inserted into respective videotapes.

The following example is offered as an aid to better understanding of how a preferred method and system may operate to insert individualized audio segments into prerecorded videotapes for a particular application. Such application may be the use of "personalized" videotapes by an automotive company as a tool for introducing an automobile to potential customers in order to foster sales. In such case, a generic videotape introducing the automobile would be created which may, for example, be similar in style to television commercial advertisements, but would be longer in length and, thus, would include more detailed information. A desired number of prerecorded videotapes (equal to the number of customers to which the company wishes to send a "personalized" videotape, e.g., 750) would be reproduced from the generic videotape. Each prerecorded videotape would then be "personalized" using the present method and system as provided in the following brief overview.

An operator enters identifying data for a particular individualized audio message segment (including customer name and the title information for the prerecorded videotape) to be inserted into one of the prerecorded videotapes. The particular message for the identifying data entered is then recorded (e.g., by an announcer reading from a script and inserting the customer name at select locations). The recorded audio information is digitized and both the identifying data and the digitized, individualized audio message segment are stored together on a data tape having digital storage capability. Such operation is repeated for additional audio messages, using different customer information in each case, until no further messages can be stored on the data tape being utilized (approximately 250–300 messages and related information). The data tape is then replaced with a blank data tape and the process is continued until all messages have been recorded and stored (i.e., 750 messages are accumulated using 3 data tapes in the present example).

In order to insert the individualized audio messages into respective videotapes, a plurality of videotape recorder units (e.g., 12) are each loaded with one of the generic prerecorded videotapes. Identifying data and related audio message segments are then sequentially retrieved from a data tape in groups of 12 (in the present case where 12 videotape recorder units are available for personalizing prerecorded videotapes). The position at which the audio message segments are to be inserted within the videotapes is then entered and each videotape recorder unit is independently controlled in order to advance its respective prerecorded videotape to that position. Each audio message segment is then transferred, simultaneously, to a respective videotape recorder unit which is independently controlled to allow the audio segment to be inserted into an audio track of the prerecorded videotape loaded therein. The prerecorded videotapes, which have been personalized, are then ejected from the respective videotape recorder units. Labels containing the identifying data for each message segment are then printed and attached to the respective personalized videotape. The process is then repeated with additional prerecorded videotapes and groups of identifying data and related audio message segments until each individualized audio message has been inserted into a respective prerecorded videotape.

It can be seen from the above summary of a preferred embodiment that the method and system herein disclosed is capable of simultaneously personalizing a plurality of prerecorded videotapes. As a result, a generic videotape may be prepared and reproduced in high volumes; these prerecorded videotapes may then be personalized for lower-volume applications in a more cost-effective manner than preparing unique videotapes for each low-volume application. Accordingly, the present methods and systems provide one or more of the following objects and advantages:

provide a low cost method of preparing personalized videotapes;

provide such a method by which prerecorded videotapes, prepared at high volumes and taking advantage of economies of scale, may be personalized for low-volume applications;

provide a method and system for simultaneously inserting individualized audio segments, respectively, into a plurality of videotapes;

provide a method and system by which individualized audio segments may be accumulated and controlled so as to allow for their insertion into video materials for purposes of personalizing said video materials;

provide a method and system for simultaneously controlling the operation of a plurality of videotape recorders so as to allow individualized audio segments to be inserted into an audio track, at a precise, predefined position, of videotapes loaded therein;

provide an effective method and system whereby one or more prerecorded videotapes may be modified as by replacing existing audio portions with an audio segment(s) tailored for that videotape(s); and, provide such a method and system which may be adapted for use with respect to a variety of video media.

Other objects and advantages of the presently disclosed methods and systems will become apparent from a review of the accompanying drawings and the discussion of various embodiments in the detailed description which follows.

BRIEF DESCRIPTION OF THE DRAWINGS

FIG. 3 is a simplified block diagram depicting an alternate embodiment of a system incorporating a method for personalizing videotapes; and, FIG. 4 is a representation of a strip of videotape illustrating aspects of the method of inserting an audio segment according to an alternate embodiment.

DETAILED DESCRIPTION OF THE PREFERRED EMBODIMENT

Figure 1A:
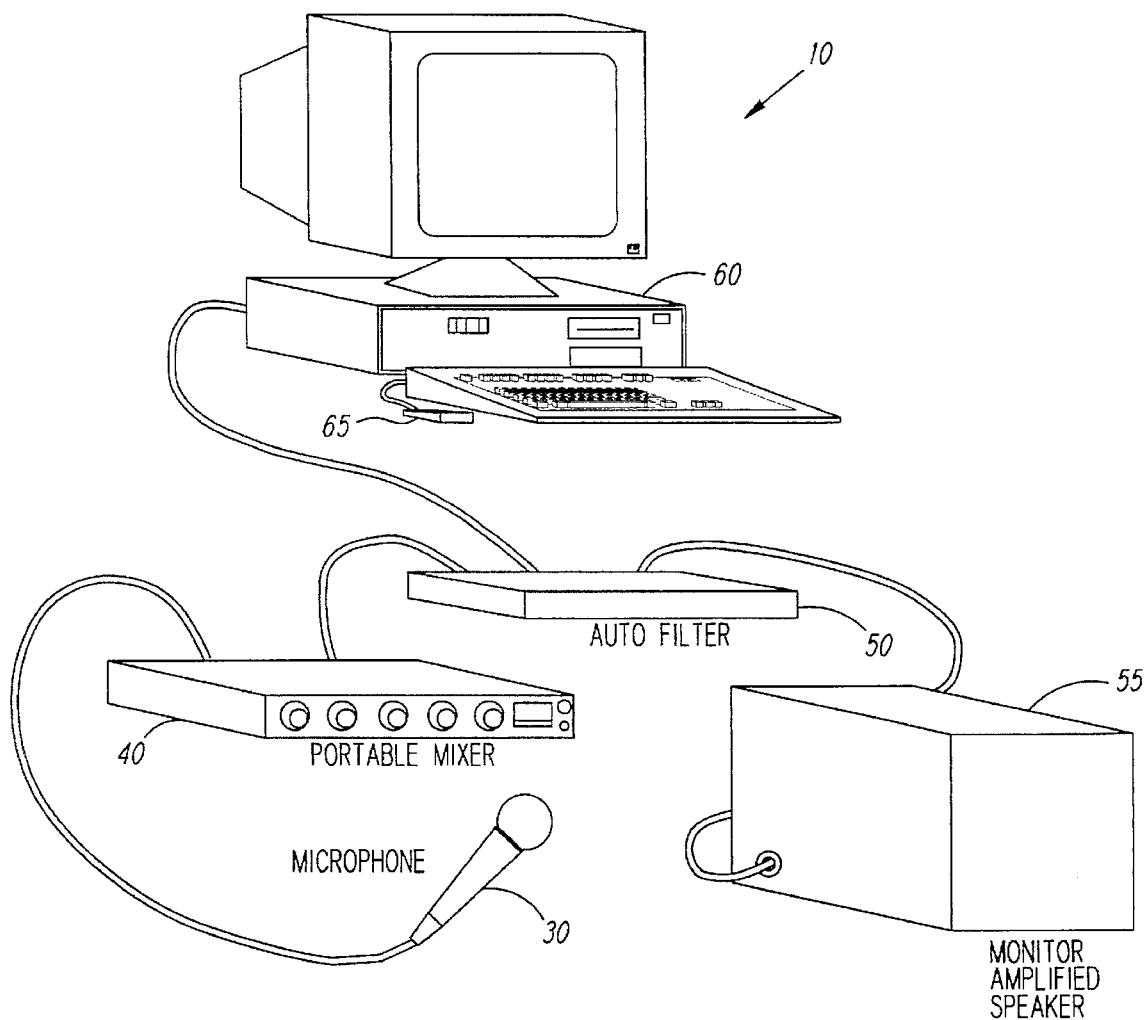
FIG. 1a is a simplified block diagram depicting a voice recording/data entry subsystem according to a preferred embodiment.

The personalization of videotapes according to the present method and system may take a wide variety of forms dependent upon the application for which they are desired. As an aid to better understanding of the background of the invention, and the subject matter of this disclosure, exemplary applications are described below. Such examples are by no means exhaustive of the possible applications, nor the types of applications and, accordingly, no limitation as to the scope of this disclosure or the claims appended hereto is intended from the following examples.

A primary application for personalized videotapes as may be prepared in accordance with the present methods and systems is for the marketing of a product and/or service by a business. In this regard, a generic videotape highlighting the product/service may be prepared (which may, for example, be directed to introducing a new automobile and may include both audio and video information) and reproduced at high volumes, using well known methods and taking advantage of economies of scale. The resulting prerecorded videotapes may each then be personalized, using a method and system as herein disclosed, by the insertion of an audio message segment at a predefined point in the videotape. Such audio message segment may identify a particular customer, or potential customer, by name and may include a sales pitch directed to factors important to that customer (as may be determined, for example, using demographics, past experience with that customer, etc.).

Alternatively, such a business as above may desire to use the same or similar generic, product/service videotapes to introduce dealers, suppliers, and/or distributors to a new or existing product/service. In such a case, the audio message segments to be inserted into each videotape may comprise a message(s) directed to such entities by their business name and may include particular sales information applicable to their sales territory, etc.

Additionally, corporations may use the presently disclosed methods and systems in order to disseminate information to various business units. For example, quarterly review meetings, board meetings, etc. may be videotaped and reproduced in sufficient quantity to send to business units, managers, shareholders, or other factions within the corporation. These prerecorded videotapes may then be personalized with audio message segments directed to a particular faction of the corporation and containing information specific to that faction.

In a different setting, the disclosed systems and methods may be used to allow an individual to personalize a prerecorded videotape of their choice (e.g., a movie title, sport video, etc., such as may be currently purchased at a retail store) to give, for example, as a gift. In such application it may be envisioned that arrangements would be made for a person to select a title (e.g., the recipient's favorite movie) and to record a personal message, in his/her own voice, directed to the recipient. Such message may then be inserted at a predefined point, e.g., during an opening credit score, or may possibly be inserted at a particular point requested by the person ordering the personalization.

Further applications are abundant and include: training/educational videos wherein students are referred to by name in order to promote learning desire; personal greeting tapes which may be created to celebrate special occasions (e.g., videos comprising vignettes related to birthdays, anniversaries, valentines day, etc.) which may then be mass-reproduced (much like greeting cards) and then personalized by individuals to send to a named recipient; or any other videotaped material which may remain basically unchanged but for some minor information which may change over time, or due to foreseeable circumstances; thus, a portion of audio may be identified for occasional replacement according to the present system and method.

With reference to the drawings, a preferred embodiment of the present invention is described as follows.

Figure 1B:
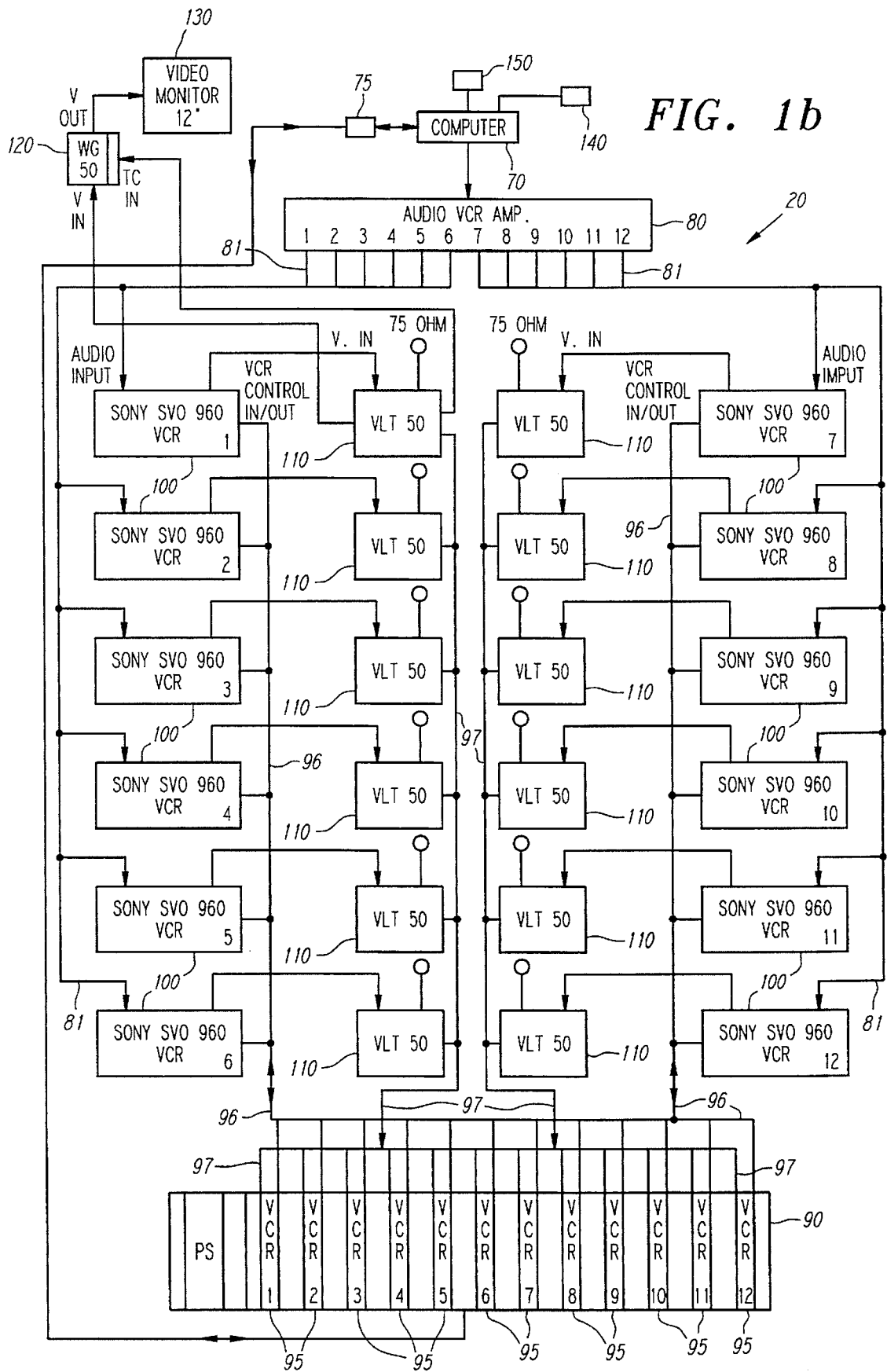
FIG. 1b is a simplified block diagram depicting a production control center subsystem according to a preferred embodiment.

Referring to FIGS. 1a and 1b, the system of the present invention for personalizing a videotape(s) by the insertion of an individualized audio segment is depicted. The system comprises a voice recording and data entry subsystem 10 (FIG. 1a) and a production control center subsystem 20 (FIG. 1b). In a preferred embodiment, as shown, these two subsystems are independent for practical reasons related to the timing of the operations performed within each subsystem. In this latter regard, and as will be better understood from further details provided hereinbelow, the production control center subsystem 20 processes audio segments in parallel by downloading groups of audio segments from a data tape; the voice recording and data entry subsystem 10 may be used to record audio segments sequentially and thus takes more time to prepare a group of audio segments to be inserted into videotapes.

Accordingly, separation of the two subsystems allows the production control center subsystem 20 equipment to be freed up for other tasks while groups of audio segments are being recorded and stored on digital data tapes. Likewise, once a group of audio segments has been accumulated, they can be moved to the production control center subsystem 20 for insertion into videotapes while the voice recording and data entry subsystem 10 can continue to accumulate additional audio segments for the same, or a different, application. Aside from practical considerations, however, the two subsystems could readily be combined with only slight modifications, related to the manner in which audio segments would be accumulated and provided for insertion, to the system and the method of operation which is further described hereinbelow. The nature of such possible variations will be better understood from the remainder of this description; accordingly, it is intended that such variations, e.g., combination of subsystems, be within the scope of this disclosure, and the claims appended hereto.

With reference to FIG. 1a, the voice recording and data entry subsystem 10 according to a preferred embodiment includes:

a microphone 30, preferably having a classic cardioid polar pattern, 50 dB–80 dB output level, an output impedance of 150 Ohms, and a frequency response from 40–16000 Hz;

a portable microphone mixer 40, capable of adjusting the input/output level of microphone signal for different announcers;

an audio filter 50, comprising a band pass filter with flat response from 50 Hz to 6.5 KHz, and a second channel with a low level line amplifier to match the input level of a powered speaker, an amplified monitor speaker 55, connected with the second channel of audio filter 50 for monitoring audio segments prior to storing in file, and having flat frequency response from 40 Hz–16 KHz with a power output of 20+ Watts; and, a computer 60, which may, e.g., be an IBM compatible computer, and may be of a portable nature, comprising a 66 MHz Intel 80486DX2 CPU with an internal math coprocessor, 8 Kbyte Internal Cache Memory, 4 MB RAM, Eight 32-bit EISA slots, Advanced AMI BIOS with EISA Extension, an Analog/Digital Card (PCL 711S), a Colorado Memory System including Jumbo 250 Drive using 250 MB preformatted Tapes, a 340 MB Hard Drive, a standard keyboard, and a 14" VGA Color Monitor, and which is programmed via customized software to operate in accordance with the description provided hereinbelow. The system may further include an audio tape player or other audio playback device (not shown) in order that analog audio signals may be supplied directly to the system from a prerecorded audio medium, e.g., audiotape, without necessitating recording thereof by the system operator. Though particular components and related specifications are identified above, such are merely exemplary of those components which may be used in a system according to a preferred embodiment; accordingly, no limitation of the scope herein is intended.

According to a preferred embodiment, the functions performed or facilitated by the voice recording and data entry subsystem 10 include:

establishing the time duration of the audio segments to be inserted into the videotapes;

receiving identification (ID) data associated with each audio segment to be recorded; such ID data being used for controlling the segment routing through processing and for the contents of a label to be printed and attached to the personalized videotape;

analog recording of the audio segments;

mixing and filtering of the analog audio segments during recording for improved sound quality;

monitoring and editing of the analog audio segments during recording to ensure acceptability prior to digitizing and storing;

compressing and digitizing of the analog audio segments; and, storing of digitized audio segments and associated ID data for subsequent recovery and insertion into videotapes.

Subsystem 10 processing proceeds with an operator initiating program operation on computer 60 in a standard manner known in the art (e.g., via keystrokes, mouse, light pen, etc.). At the outset, system parameters, such as the number of audio segments to be recorded and stored, the maximum time duration of each audio segment etc., may or may not be preprogrammed depending on the application(s) in which the system is being implemented. Such parameters may readily be entered as required, pursuant to prompting or otherwise, if not already programmed into the system.

Once subsystem 10 is so initialized, the operator is prompted to enter ID data associated with the first audio segment to be recorded. Such information may include, but is not limited to: any title applicable to the prerecorded video material into which the audio segment is to be inserted; any name and/or personal information associated with the ultimate recipient of the personalized videotape(s) into which the audio segment is to be inserted; any name associated with the entity (e.g., corporation, etc.) for whom one or more personalized videotapes are being prepared for subsequent distribution to the ultimate recipient(s); and any job/order number(s) associated with all of the audio segments being recorded for an entity (e.g., for all similar audio segments to be recorded onto identical prerecorded videotapes using the same time duration and insert location constraints). In addition, an identifying number (which may be sequential and may be system generated) may be associated with the above ID data and may correspond to each individual audio segment being recorded.

The ID data entered for each audio segment serves to identify that audio segment through processing and is used to control and track the flow of that audio segment within the system. Such ID data, along with subsequently generated information relating the particular videotape into which each particular audio segment has been inserted, may also become the contents of labels to be printed and attached to respective videotapes after the personalization process is completed for a group of audio segments. As the discussion hereinbelow will make clear, such operation ensures that the correlation of each audio segment to the respective videotape into which it is inserted is maintained throughout the processing.

While it is desirable that ID data, as provided above, be entered in association with each audio segment recorded or otherwise accumulated, entry of such data is not essential to the operation of the methods and systems herein disclosed. In this regard, it is beneficial to have the above data associated with an audio segment to both aid in tracking of that segment and to provide the contents of a videotape label in conjunction with the audio segment being inserted into a particular videotape. However, the system could readily generate and assign a number for use in tracking and controlling the flow of an audio segment without necessitating entry of any data by an operator. Alternatively, no number or additional data need be assigned to an audio segment whatsoever; rather, the operator could be responsible for manually keeping track of segment contents and any associated videotape into which it is inserted. In either of these latter situations, labels may still be prepared, either manually or by a separate system, which contains the ID data.

With reference, again, to the preferred embodiment, upon entry of ID data for a first audio segment, the subsystem 10 prepares to receive an analog audio segment via microphone 30. Accordingly, a screen is displayed indicating the time allotted for recording of the audio segment and a prompt directing the operator to indicate (such as by keystroke, etc.) when recording is to begin. The analog signal received via microphone 30 may be processed via a mixer 40 and audio filter 50 in order to adjust sound levels to accommodate different announcers and to eliminate any extraneous background or other noise which may otherwise be picked up through microphone 30, and may negatively impact the quality of the audio segment as a result of the digitization process (as will be further described hereinbelow).

The processed analog signal is received into computer 60 and may be further processed as by compacting or compressing and digitizing the signal in any manner well known to those skilled in the art. For example, in the preferred embodiment, a 4:3 factor compression is utilized as such ratio provides adequate quality for voice information without overly limiting the amount of data which may be stored. Different compression factors could readily be utilized. For example, a higher compression factor may be used in order to obtain compact disk quality recording of audio information, however, the number of videotapes which may resultingly be personalized would be reduced accordingly unless storage capacity were also increased. Additionally, the quality of the stored audio message segment may be varied (with attendant variation in the number of messages capable of being stored) by programming adjustments with respect to the sampling rate associated with the digitization of the audio signal (e.g., a preferred embodiment provides for sampling rates between 8 kHz and 44.1 kHz with a rate of 16 kHz suitable for recorded audio segments).

The digitized audio segment is then stored, along with associated ID data previously entered (as described above), on digital data tape 65 inserted into the digital data tape drive unit associated with computer 60. Additional audio segments may similarly be recorded by entry of ID data as prompted, and recording of audio segments in sequence. The accumulation of audio segments and associated ID data continues in this manner until all audio segments for a given application have been stored.

In the embodiment as shown in FIGS. 1a and 1b, it may be the case that the number of audio segments to be accumulated for a given application exceeds the number of such audio segments and associated ID data which may be stored on digital data tape 65 (which is dependent upon the length of each segment and the amount of ID data to be associated with each segment but may, for example, be 250–300 audio segments of approximately 30 second duration). If such situation occurs, the digital data tape 65, when full, could be removed from the voice recording and data entry subsystem computer 60 and replaced with a blank digital data tape. Audio segment accumulation could then continue while the segments on the full digital data tape 65 are being inserted into videotapes in the production control center subsystem 20.

While direct recording of audio segments into the voice recording and data entry subsystem 10 is provided in the preferred embodiment above, other means of receiving audio segment information into the system may be envisioned and are intended to be within the scope of the disclosure herein and the claims appended hereto. For example, a customer desiring the personalization of videotapes may do their own recording of the audio segments to be inserted. In such case, the prerecorded audio segments may be provided to the voice recording and data entry subsystem 10 operator using any of a variety of known audio recording media (standard audio tape, diskettes, disks, etc.). Accordingly, the voice recording and data entry subsystem 10 could interface with a device which is capable of playing back the audio segment information recorded onto that medium. An audio signal from the playback device would then be received into the voice recording and data entry subsystem 10 and operated upon in a manner similar to that with respect to the received microphone signal detailed above (and which may, for example, include filtering the incoming signal and interposing ID data related to each audio segment).

Additional variations with respect to receipt of the individualized audio segments may also be envisioned and may be readily accommodated by the present method and system. For example, audio segments could be prerecorded by the customer, or other party, in a digital format and could be provided to the voice recording and data entry subsystem 10 operator on digital disk (e.g., compact disc, mini disk, or like medium). If the digital format were compatible with that provided by the voice recording and data entry subsystem 10, then such segments may be transferrable to digital data tape 65 without modification (except, possibly, for the interposing of associated ID data related to each audio segment if such is not already provided on the medium utilized).

Alternatively, the digital medium provided by the customer or third party may be used directly to provide audio segments (with or without identification data) to the production control center, without first transferring such segments to digital data tape. For example, a digital minidisc, or other digital medium, may be prepared by a customer or third party to provide the audio segments in a format which may be received directly by the production control center subsystem and, thus, obviate the need for the voice recording and data entry subsystem at the site where the production control subsystem is located. Additionally, each audio segment so provided could be stored with header information on the mini-disk (or other medium utilized) such that it may be independently distinguished and further associated with identification data as provided herein.

Consistent with such possible variations as identified above, and other variations attendant with the source of audio segments, the method and system herein described may be adapted to be compatible with any of a variety of multi-media components. In this regard, the voice recording and data entry subsystem computer 60 could include a sound card to be inserted into a slot within computer 60 or a sound (multi-media) chip integrated into a board within the computer 60, either of which may be components known to those skilled in the art and readily available as a computer peripheral device. The voice recording and data entry subsystem computer 60 may then operate to process audio segment information through such sound components in real time, utilizing a known Resource Interchange File Format in order to convert the audio information received into the desired digital format for use by the production control center subsystem 20.

The above, and similar, variations related to the manner in which audio segment information are received into the system are readily incorporated into the present method and system in manners known to those skilled in the art. It is intended, therefore, that such variations and attendant modifications to the system are within the scope herein.

Resuming discussion of the preferred embodiment, the production control center subsystem 20 according to a preferred embodiment includes:

a computer 70, which may comprise an IBM Compatible of similar specification to that of voice recording and data entry subsystem computer 60;

an audio amplifier/filter 80, comprising a 12 channel custom audio band pass filter, a custom microprocessor unit 90, which may comprise a number of VTR control cards 95 equal to the number of VTR units connected within the system for personalizing videotapes, and which is capable of independently controlling each of the plurality of VTR units;

an interface card 75, which may be connected between the production control center computer 70 and the VTR control cards 95 and may control the transfer of serial information into respective VTR control cards 95;

VTR units 100, which may, as in the embodiment shown, comprise twelve Sony SVO 960 VCR's (though this number could be more or less depending only upon practical considerations related to system costs, memory constraints, physical space, application needs, etc.) and which are connected to and independently controlled by a respective VTR control card 95;

VTR control lines 96, connected between each VTR control card 95 and a respective one of the VTR units 100;

time code reference lines 97, connected between each VTR unit 100 and a respective one of the VTR control cards 95;

a time code translator 110, which may be an Horita VLT-50 VITC-to-LTC Translator, associated with each VTR unit 100 and interconnected along respective time code reference lines 97;

a window dub inserter 120, which may be an Horita WG-50 Window Dub Inserter, connected between one of the translators 110 and a monitor 130, and may be used to verify proper time code position location during the insertion process by dubbing the time code position into the corresponding video image displayed on monitor 130 which comprises the video image from one of the plurality of VTR units 100 during the audio insertion process;

a printer 140, which may, for example, be a Zebra 105, in communication with production control center subsystem computer 70 and capable of printing labels to be attached to videotapes, and may also be capable of printing bar code symbols onto the labels; and, a display 150, associated with production control center computer 70. Though particular components and related specifications are identified above, such are merely exemplary of those components which may be used in a system according to a preferred embodiment; accordingly, no limitation of the scope herein is intended.

The functions performed or facilitated by the production control center subsystem 20 may include:

downloading stored, digitized audio segments and associated ID data from digital data tape in groups comprising a number of audio segments which corresponds to the number of videotapes the system is capable of simultaneously personalizing;

initializing VTR's connected within the system, correspondingly assessing the operational status of each VTR (including whether each VTR is working, whether a videotape is loaded into each VTR, etc.), and identifying and excluding VTR units which are unable to proceed with insertion;

associating each audio segment in a downloaded group with a respective VTR into which a videotape is loaded for insertion of an audio segment therein;

receiving time code information relating to the insertion point(s) to be used;

independently controlling each VTR connected within the system (including start/stop functions, operating speed, recording, eject, etc.);

locating the proper insertion point with respect to each videotape loaded into a VTR;

simultaneously inserting audio segments independently into respective videotapes;

assessing proper insertion of each audio segment into a respective videotape;

keeping track of the particular videotape into which each audio segment has been inserted;

ejecting each "personalized" videotape from its corresponding VTR upon proper completion of the insertion process; and, printing labels for correctly completed videotapes.

With reference to FIG. 1b, the production control center subsystem 20 of a preferred embodiment operates as set forth below. The production control center computer 70 serves as an interface between the operator and the production control center subsystem 20 and allows for entry of control data (such as time codes used for insertion point location) as well as providing the means for receiving audio segments to be inserted into the videotapes. A digital data tape 65 is inserted into the digital data tape drive slot of computer 70. In a standard fashion, system software is initiated so that the insertion process may begin. The production control center computer 70 downloads a number of audio segments from digital data tape 65 which may, for example, correspond to the number of VTR units 100 connected within the system. In conjunction with the downloading of audio segments, the production control center subsystem computer 70 may associate each audio segment with a VTR unit 100 known to be connected to the production control center subsystem 20. Such association may, for example, be sequential. To this end, each VTR unit 100 may have an identifying code associated therewith (e.g., a numeric reference from 1–12 in the embodiment shown) which allows the production control center subsystem computer 70 and the custom microprocessor unit 90 to independently interact with each VTR unit 100 as will be further detailed hereinbelow.

Information transfer between the computer 70 and respective VTR control cards 95 is accomplished through an interface card 75 which may be interposed between the computer 70 and the VTR control cards 95 in any of a variety of ways. A preferred approach is to integrate the interface card 75 within the custom microprocessor unit 90. However, the interface card 75 may readily be designed for incorporation into a slot within the production control center computer 70. Further, and as shown in FIG. 1b for purposes of illustration, the interface card 75 may be designed as a separate component which may be interconnected between the computer 70 and the custom microprocessor unit 90. A purpose of the interface card 75 is to effect information exchange, e.g., serially, from computer 70 to each of the VTR control cards 95. Such information exchanged may include time code information as entered for each respective VTR unit 100; control information, e.g., signalling that the system is in a ready state; and status information pertaining to respective VTR units 100, which may then be incorporated into a display 150 associated with the production control center computer 70 as further detailed below.

Figure 2A:
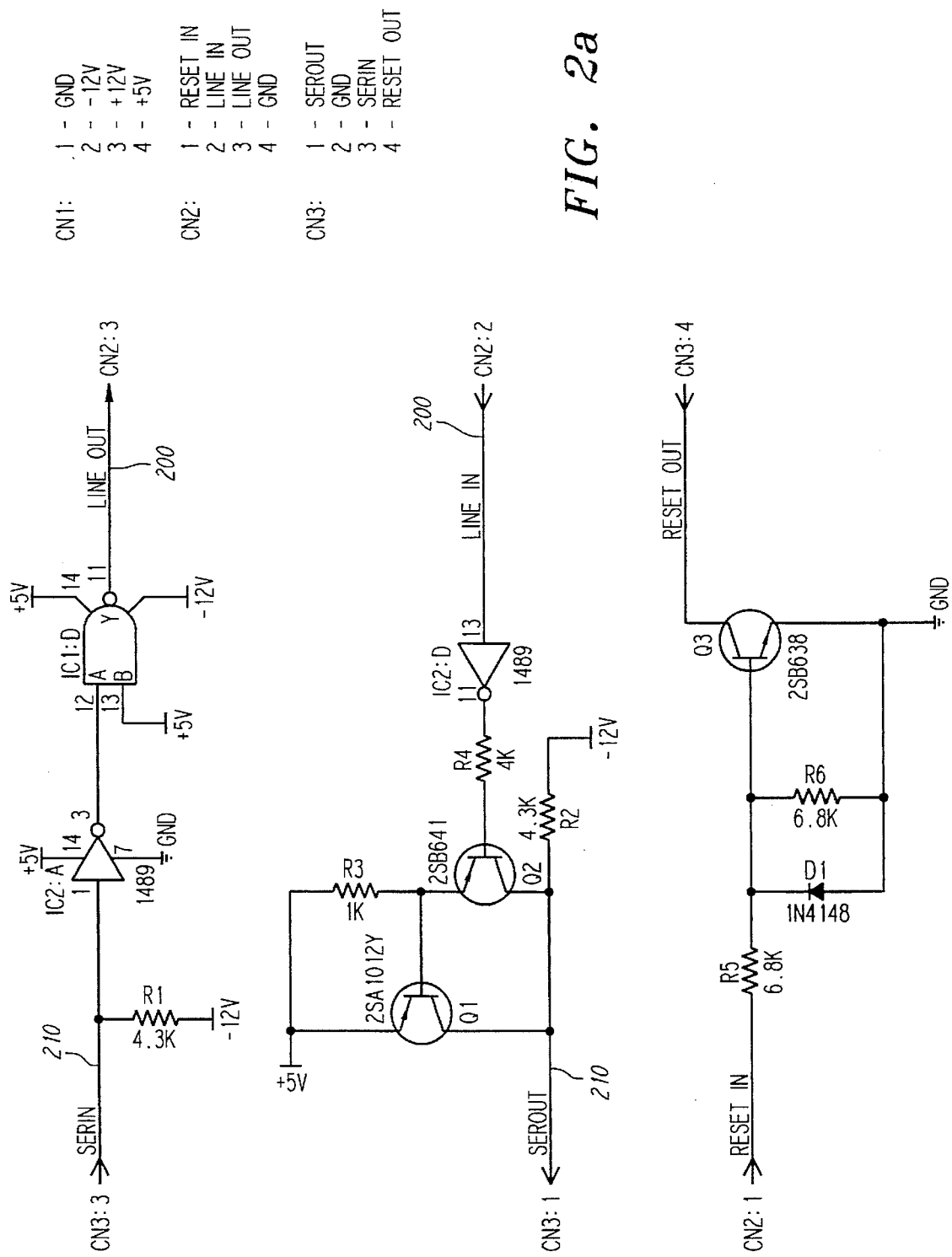
FIG. 2a provides a schematic representation of an exemplary circuit which may be used to interface a production control computer with videotape recorder unit control cards according to a preferred embodiment.
Figure 2B:
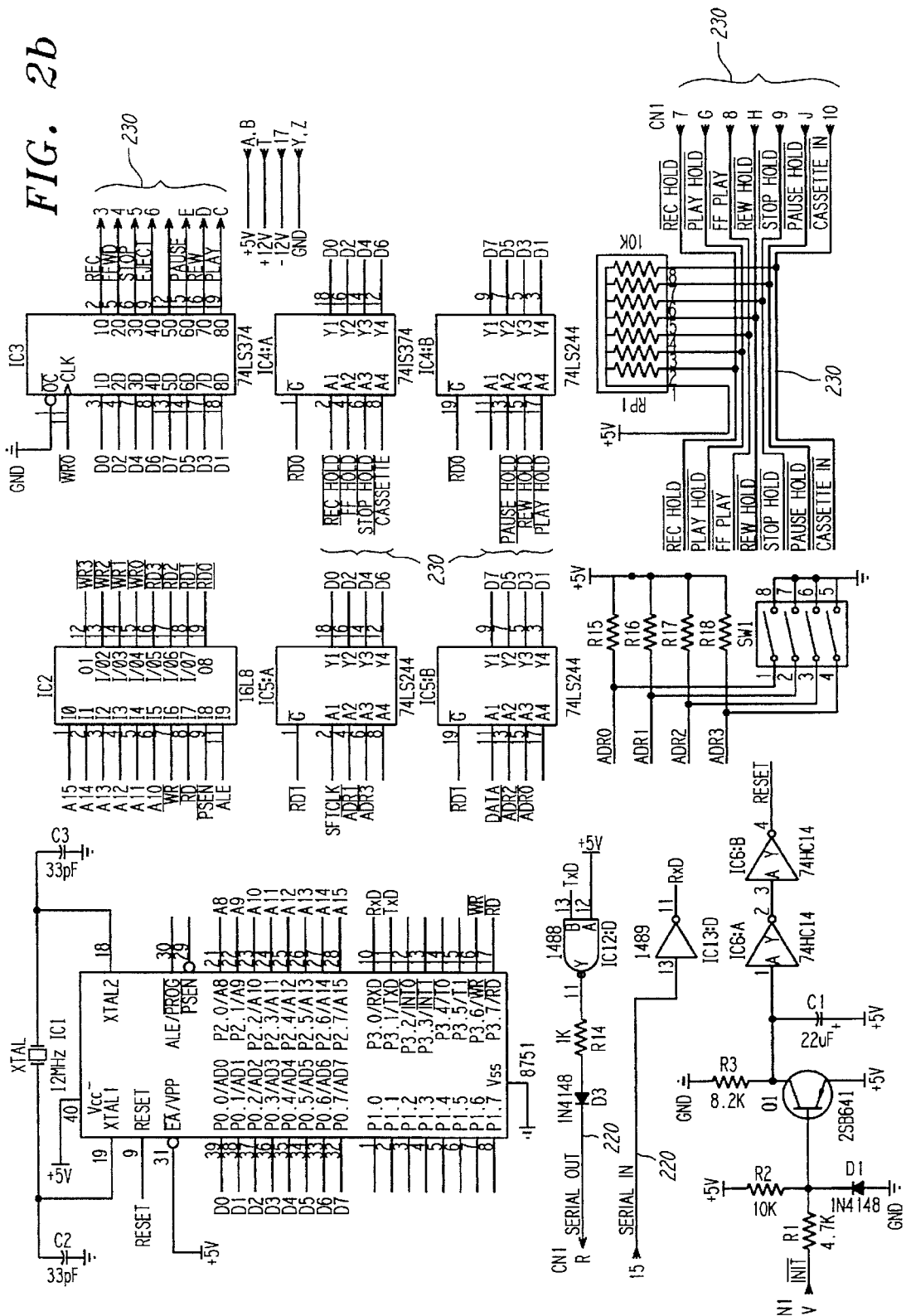
FIGS. 2b and 2c provide schematic representations depicting portions of an exemplary circuit which may be used to control the operation of a videotape recorder unit according to a preferred embodiment.
Figure 2C:
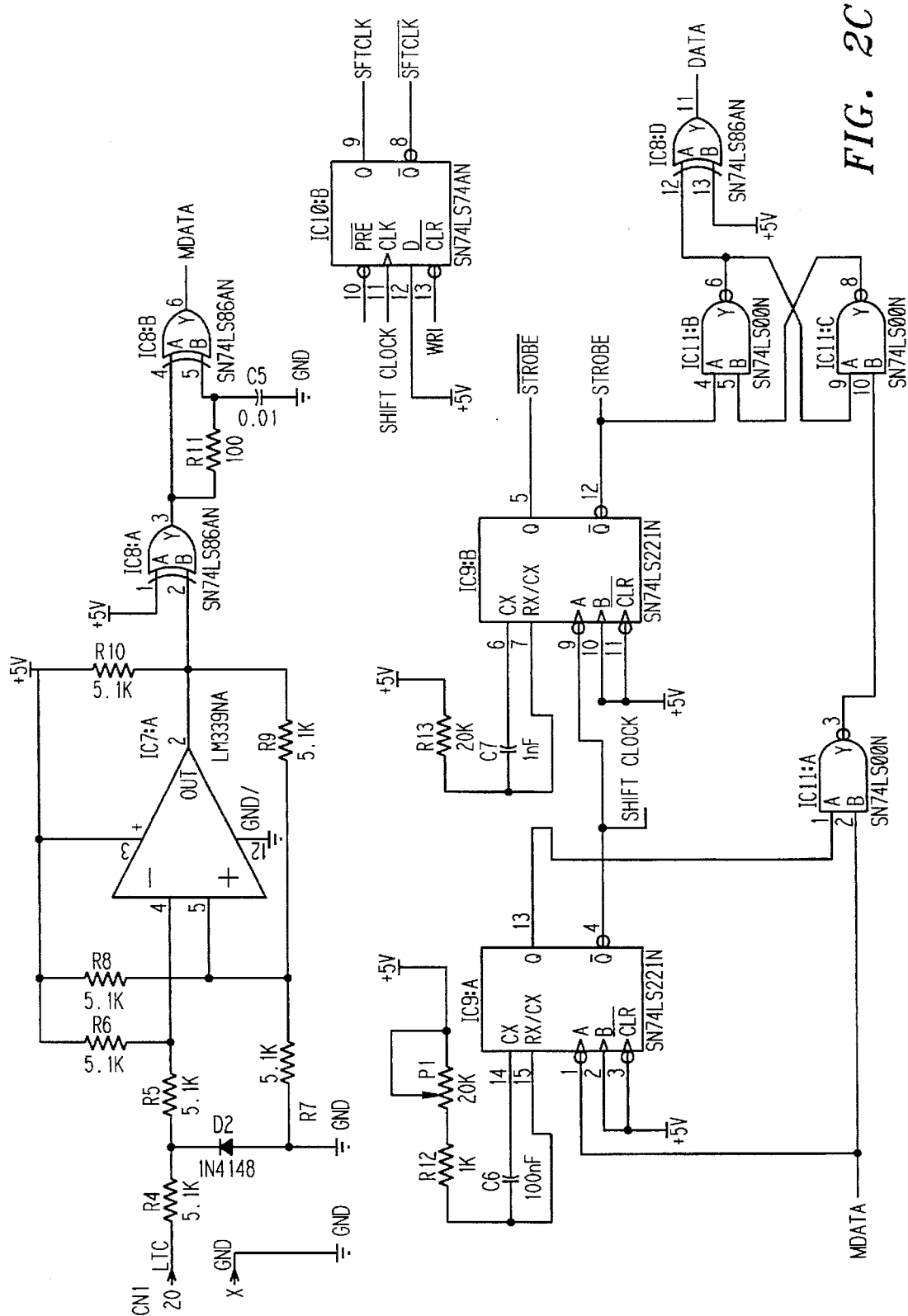

Exemplary circuits which may be employed for use as an interface card 75 and VTR control cards 95, according to a preferred embodiment, are illustrated in FIG. 2a and FIGS. 2b and 2c, respectively. In FIG. 2a, an interface card 75 is shown wherein communication to and from computer 70 is accomplished along data lines 200 while communication between interface card 75 and respective VTR control cards 95 is via serial data lines 210. With reference to FIGS. 2b and 2c, together, there is shown an exemplary circuit which may be employed for use as a VTR control card 95 according to a preferred embodiment. With respect to the embodiment shown in FIG. 1b, twelve (12) such VTR control card 95 circuits as provided in FIGS. 2b and 2c would be incorporated into the custom microprocessor unit 90 such that each VTR control card 95 would control the operation of a respective VTR unit 100. As shown in FIG. 2b, data lines 220 are provided and are used to effect communication with the interface card 75 as described previously with respect to FIG. 2a. Control of a respective VTR unit 100 connected to VTR control card 95 is accomplished by means of control lines 230.

Figure 2D:
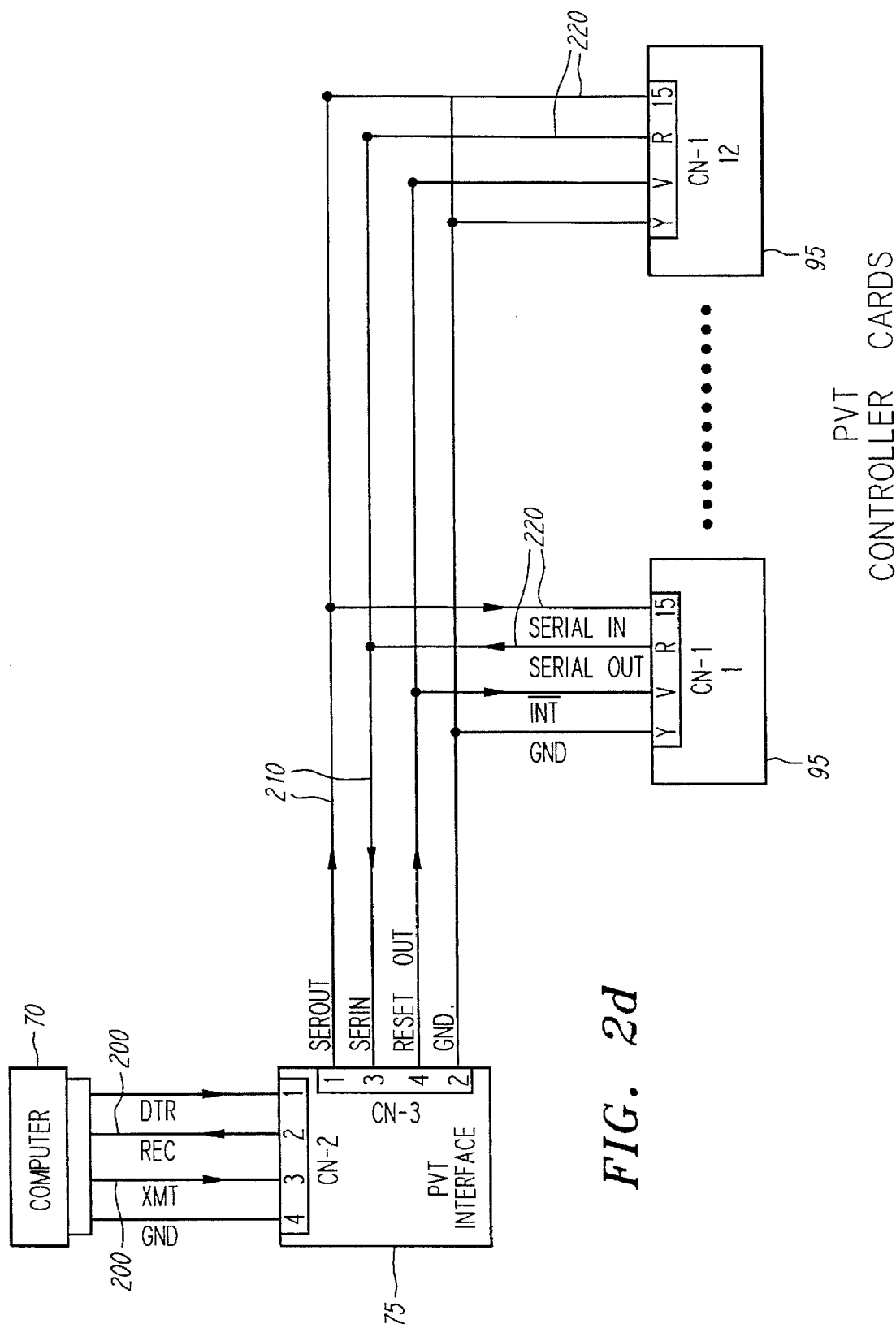
FIG. 2d is a simplified block diagram illustrating interconnections between certain of the components of FIGS. 1b, 2a, and 2b according to a preferred embodiment.

With reference to FIG. 2d, a simplified diagram is provided which illustrates the connections between the computer 70 and the exemplary circuits of FIGS. 2a (interface card 75) and 2b (VTR control card 95), according to the preferred embodiment. Reference numerals identified in FIG. 2d correspond to like references previously identified with respect to FIGS. 1b, 2a, and 2b.

As FIGS. 2a–2d, and the accompanying discussion above show, VTR control cards 95, and an interface card 75 which is capable of effecting communication and exchange of information between computer 70 and each of the VTR control cards 95 may be implemented using components which are readily available to and understood by someone who is skilled in the art. Likewise the operation of the exemplary circuits illustrated in FIGS. 2a, 2b, and 2c, in order to effect the control of a plurality of VTR units 100 such that individualized audio segments may be inserted into videotapes loaded therein, respectively, may be readily understood by one skilled in the art with reference to the detailed description of the preferred embodiment herein.

Returning to reference FIG. 1b, display 150, associated with production control center subsystem computer 70, may visually relate information, which may, for example, comprise status information for each VTR unit 100 and the audio segments to be inserted therein, to the production control center subsystem 20 operator. In this regard, display 150 may display representations of each VTR unit 100 which provide, via highlighting or the like, the operating status of each VTR unit 100. Once all of the audio segments comprising a group to be inserted are downloaded and initially associated with a particular VTR unit 100, the production control center subsystem 20 then prompts for entry of time code information to be used to locate the insertion point for the audio segments within each videotape.

While the use of time code information is a preferred means of identifying the beginning point at which audio segments will be inserted into videotapes, other means of identifying such point are feasible. For example, as discussed below with respect to an alternate embodiment, a counter may be used. Other such means are likewise envisioned and are meant to be within the scope of this disclosure and the claims appended hereto. Additionally, points other than the beginning insertion point may be entered without departure from the scope herein. For example, the ending insertion point with respect to an audio segment of known length, or identification of a position of known offset from the beginning insertion point, etc. may be entered and the corresponding insertion point determined therefrom.

Resuming with discussion of the preferred embodiment, time code information may, for example, be entered according to the Vertical Interval Time Code (VITC) format known to the videotape field of art. Consistent with this format, the production control center subsystem 20 operator would enter the hour, minute, second, and frame information related to the point at which insertion of an audio segment is to begin. The production control center subsystem computer 70 may then convert the entered VITC time code information, according to known relations, into corresponding Longitudinal Time Code (LTC) format and may supply this latter information to the respective VTR control cards 95 for use as described further below.

Upon receipt of time code information and an instruction from the operator to begin, the system indicates (such as by an audible signal) that it is ready. Accordingly, prerecorded videotapes may then be loaded into respective videotape recorder units. A timer may be incorporated within production control center subsystem computer 70 which, upon initiating software operation and downloading audio segments, assesses the operational status of each VTR unit 100, via VTR control cards 95, including whether a videotape has been loaded, respectively, therein. In this regard, a timer could be set to an arbitrary time duration which will allow all VTR units 100 to be loaded with videotapes for insertion of an audio segment(s) (e.g., such time may be set for 20 seconds, but may be as long desired given production considerations, from the time a first loaded VTR unit is detected). The timer may be started once the loading of a first videotape into a videotape recorder unit is detected. From such point, the operator would then have an amount of time equal to that set for the timer in which no complete the loading of videotapes into all of the videotape recorder units.

At the expiration of such time as is entered for the above timer, any VTR unit 100 which has been detected to be non-operational or not to have been loaded with a videotape may be excluded from that insertion stage. Accordingly, any audio segment(s) which may have been associated with an excluded VTR unit 100 may be retained in the memory of computer 70 for the next insertion stage. The retained audio segment(s) may then be processed along with other audio segments downloaded in the next insertion stage. In this latter regard, the number of audio segments downloaded may be adjusted by the number of audio segments which have been retained as a result of the above timer operation. Representations of each VTR unit 100 displayed on display 150 may reflect such status of each VTR unit 100, i.e., including whether a videotape has been loaded therein.

The VTR control cards 95 effect time code searching with respect to each VTR unit 100 as follows. A signal from each VTR control card 95 is sent, via VTR control lines 96, to a respective VTR unit 100 which causes that unit to commence operating in fast forward mode. Each VTR control card 95 then monitors its respective VTR unit 100 by reading the time code position of each VTR unit 100 via time code reference line 97. In this latter regard, a time code translator 110 is interposed, along each time code reference line 97, between each VTR unit 100 and its respective VTR control card 95. The time code translators 110 each serve to translate the VITC format time code information, encoded into the videotape loaded into a respective VTR unit 100, into LTC format time code information so that comparison may be made with the previously entered time code information identifying the insertion point for audio segments.

Time code conversion from VITC to LTC formats is employed according to the preferred embodiment since direct reading of and operation on VITC format information requires a high speed reader and microprocessor. Conversion to LTC format allows for use of a less expensive, lower speed microprocessor. Aside from such considerations, however, the method and system herein disclosed could readily be adapted to eliminate the conversion to LTC format and instead operate directly upon VITC format time code information. Accordingly, such an embodiment is intended to be fully within the scope of this disclosure and the claims appended hereto.

As each VTR unit 100 reaches a point, e.g., 3 seconds, prior to the desired time code position for that VTR unit 100, the respective VTR control card 95 sends a signal on control line 96 to that VTR unit 100 which causes it to revert from fast forward to normal play speed in order to approach the desired time code position with greater assurance of precision (e.g., within 1 frame accuracy). When each respective VTR control card 95 senses, via time code reference line 97, that its particular VTR unit 100 has reached the desired time code position, it sends a signal on the respective VTR control line 96 which causes that VTR unit 100 to remain at that position (e.g., causing the VTR to enter a pause mode).

Use of the fast forward operating mode to locate the insertion point according to a preferred embodiment, as above detailed, may provide significant time savings with respect to the insertion process. This is particularly true in applications where the desired insertion point occurs at a later time in a lengthy videotape. However, use of fast forward mode in the above manner is not a necessary aspect of the present method and system and such operation should not be limiting of the scope of the methods and systems herein disclosed and claimed. Alternatively, each VTR unit may be signalled, instead, to operate at normal play speed to locate the insertion position. Indeed, according to a further aspect of the preferred embodiment, normal play mode, as opposed to fast forward mode, would be used in applications where the insertion position occurs early on in the videotape since there may not be enough lead length on the videotape to effect fast forward searching.

Once a first VTR unit 100 has reached the desired time code position, a timer associated with production control center subsystem computer 70 is then started. Such timer is set to a maximum time limit, based on an amount of time that it is expected to take for all VTR units 100 to reach the desired time code position, and during which the production control center subsystem 20 will wait for all VTR units 100 to reach such point (e.g., 5 seconds). In this manner, processing (i.e., insertion of audio segments) is not halted completely should one of the VCR units 100 fail, or otherwise not operate at an expected speed.

If the timer should expire prior to all VTR units having reached the desired time code position, the system will exclude those VTR units which were not ready from the insertion process. Excluded VTR units 100 may also be identified, as by such VTR units 100 being signalled to eject the videotape loaded therein and/or by representation on display 150, so that the operator may correct any problem(s) which caused that VTR to be excluded. Additionally, the production control center subsystem computer 70 will retain any audio segment(s) which had been associated with any of the excluded VTR units 100 in memory and will process such audio segments with the next group of audio segments to be inserted (accordingly, the number of audio segments downloaded from the digital data tape 65 during the next insertion stage may be decreased by the number of audio segments retained as a result of such operation).

When all VTR units 100 have reached the desired time code position, or, upon timeout of the aforementioned timer, the actual insertion of audio segments into respective videotapes may commence. To this end, production control center subsystem computer 70 causes VTR control cards 95 to signal each respective VTR unit 100 (other than those which may have been excluded as discussed above), via VTR control lines 96, to operate in play/audio dub mode. In association with the commencing of operation of VTR units 100, production control center subsystem computer 70 transfers each audio segment, which, by means of a digital to analog converter incorporated within the production control center subsystem computer 70, are converted to analog signals, to respective VTR units 100.

The transfer of audio segments is accomplished, in parallel, via audio lines 81 which are connected to an audio input of each respective VTR unit 100 with which a particular audio segment has been associated. An audio amplifier 80 may also be interposed between the production control center subsystem computer 70 and the VTR units 100 which receives the analog audio signals from computer 70, provides appropriate amplification such that the level of the audio segment inserted into a videotape blends with existing audio information which may be present on the videotape, and passes the amplified audio segments to respective VTR units 100 via audio lines 81 for insertion into respective videotapes.

Upon completion of transfer, and, accordingly, the simultaneous insertion of audio segments into respective videotapes, each of VTR control cards 95 sends a signal on control lines 96 to their respective VTR units 100 which places that VTR unit 100 in stop mode. Additionally, each VTR unit 100 may similarly be signalled to rewind and/or to eject the personalized videotape loaded therein. In a preferred embodiment, the VTR units are not signalled to rewind since time spent rewinding could be used instead for insertion of additional audio segments into additional videotapes. In such case, the VTR units are signalled to eject at the completion of the insertion stage and the "personalized" videotapes therein may then be rewound off-line.

If additional audio segments are ready for insertion, e.g., audio segments remain on digital data tape 65 or remain in memory as a result of exclusion from a previous stage as discussed above, the above processing may be repeated, as necessary, until all such audio segments for a given application have been inserted into videotapes.

Should an embodiment providing for multiple audio segments to be inserted into videotapes at differing positions therein, the production control center subsystem 20 may instead operate, pursuant to entry of additional time code position data, to locate the new time code position and insert additional audio segments in the same manner as detailed above until all such audio segments have been inserted into the videotapes then within VTR units 100.

In another aspect of a preferred embodiment of the present methods and systems, a label containing information identifying each videotape and the audio segment inserted therein may be printed. In this regard, the ID data previously associated with each audio segment, along with identifying information relating to the VTR unit 100 which contains the videotape into which each such audio segment has been inserted, may be printed on respective labels provided in printer 140 associated with production control center subsystem computer 70. Additionally, the preferred embodiment provides for the generation of a bar code symbol associated with each individualized audio segment inserted into a respective videotape. This bar code symbol may also be printed on the respective labels which may then be affixed to each videotape, e.g., in conjunction with removal of the videotapes from the VTR units 100, so as to maintain correspondence between particular audio segments and the respective videotapes personalized therewith. The bar code symbols may be used to facilitate tracking of the "personalized" videotapes throughout the remainder of processing and shipping.

Since tolerance differences may exist between different VTR units attendant with their operation as relates to reaching a particular time code position, a preferred embodiment of the present method and system provides for each of the VTR control cards 95 to be tuned to the respective VTR unit 100 with which it is associated. Accordingly, each VTR control card 95 may adjust timing calculations to account for any such tolerance differences, e.g., in operating speeds of VTR units 100, in order to ensure that each audio segment is accurately and precisely inserted at the desired time code position. Such tuning may, for example, include the incorporation of a "± factor" to be added or subtracted from time code information in order to adjust the stopping position of the respective VTR unit 100 being controlled by a particular control card 95. Accordingly, each VTR unit 100 may be calibrated in order to determine a tolerance value (with respect to actual tape position vs time code position indicated) which may be used to establish the "± factor" to be incorporated within the control card 95 which will control that VTR unit 100.

While a preferred embodiment of a method and system for personalizing a plurality of videotapes has been detailed above, many variations to parts or all of the above method and system are possible without departure from the scope of this disclosure. Accordingly, while the preferred embodiment above suggests the insertion of a single audio segment into each of a plurality of prerecorded videotapes, at the same time code position within each videotape, and with each of the audio segments being unique from each other of the audio segments, such characteristics are application dependent only and are not required by the method and system herein.

Thus, for example, there are no inherent limitations attendant with the present system and method that would prevent its use for inserting the same audio segment into multiple videotapes. The method and system above could be readily adapted for such purpose, such as by duplicating that audio segment prior to the simultaneous insertion process, or by maintaining that audio segment in memory throughout a desired number of simultaneous insertions (e.g., along with sequential groupings of segments to be inserted for the same application), or in any other manner allowing for multiple operations to be performed with respect to the same audio segment.

Similarly, there are no inherent reasons why the method and system herein disclosed could not be adapted so as to provide for the insertion of multiple audio segments (or the same audio segment multiple times) at differing points within each of the videotapes. While such multiple insertions could not, of course, all occur simultaneously, the system could readily be adapted to make several insertion "passes" while simultaneously inserting audio segments into videotapes with respect to each separate time code position entered.

Likewise, with respect to the time code position used to identify the insertion point within the plurality of videotapes, the present system and method may readily be utilized to identify different time code positions for each VTR (and, thus, for each videotape loaded therein) such that the audio segments (whether unique or not) may be inserted at different points with respect to each videotape. Further, as should be obvious from the above discussion, there are also no reasons why the plurality of videotapes to be personalized would need to be identical.

The main impact with respect to the use of different videotapes, and/or some others of the system variants discussed immediately above, would be of a logistic nature, i.e., increased operator awareness and interaction to ensure the insertion of the proper audio segment(s) on the proper videotape(s) would be required; accordingly, too, the overall production time may be greater due to such human factors. System modifications required to realize the above variations in operation would be minimal and would be readily accomplished via programming instruction. Furthermore, additional hardware components would not be required in order to realize the above-identified variants. However, if desired, additional Window Dub Inserters 120 and Monitors 130 may be connected with respective time code translators 110 in order to verify proper audio insertion positions in the case where different time codes are utilized and/or different videotapes are to be personalized. Alternatively, the single window dub inserter 120 and monitor 130, as shown in FIG. 1b, may be connected to multiple time code translators 110 through a switching device which may allow different VTR units 100 to be monitored for proper audio insertion position, e.g., in the case where different time codes are utilized.

Alternative embodiments of a method and system for personalizing a plurality of videotapes by the insertion of an audio segment(s) are also envisioned and intended to be within the scope of this disclosure. According to one such embodiment, a different technique for locating the point at which an audio segment is to be inserted along the videotape is utilized. With reference to FIG. 3, that part of the system controlling the insertion of audio segments into videotapes loaded into a plurality of VTR's is shown (i.e., the production subsystem 20) according to an alternative embodiment.

As shown, such a system 300 comprises VTR units 310, a computer 320 including a port controller card 330 and four 6-channel audio server cards 340, audio signal lines 345 connected between the audio server cards 340 and each VTR unit 310, a videotape shuttle controller 350 comprising VTR control cards 360 associated, respectively, with each VTR unit 310, and VTR control lines 365 interconnected between each VTR control card 360 and respective VTR units 310. In operation, VTR units 310 are controlled via computer 320 in conjunction with VTR control cards 360 associated with videotape shuttle controller 350. As expected, rewound videotapes into which audio segments are to be inserted are loaded into the VTR units 310.

Figure 4:
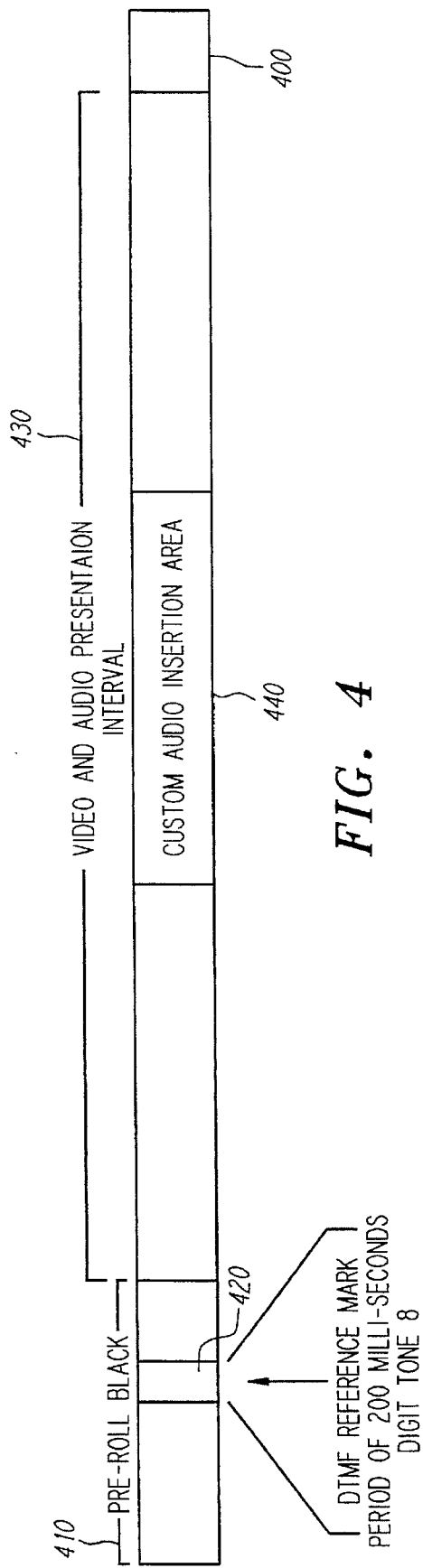

With reference to FIG. 4, there is shown a representation of videotape 400 including:

a pre-roll black portion 410, which may be specified to any duration, e.g., 30–40 seconds, and which precedes the actual video material comprising the subject matter of videotape 400;

a reference mark 420, which may comprise any of a variety of recorded signalling points, such as an audible tone or queue, inserted at the same location within each prerecorded videotape 400;

a video and audio presentation interval 430, wherein the subject matter comprising the prerecorded videotape 400 is provided; and, a custom audio insertion area 440, wherein a portion of the existing audio, if present, within videotape 400 may be replaced by an individualized audio segment.

According to an exemplary application of this alternate embodiment of the present method and system, reference mark 420 may comprise an audio tone of certain duration, e.g., 200 msecs, which conforms to the known Dual-Tone-Multi-Frequency (DTMF) standards as provided by the telephone industry. For example, such tone may comprise the DTMF representation of the number Reference mark 420 may conveniently be placed at any known point within the pre-roll black portion 410 (which is also of known duration) of videotape 400.

Insertion of audio segments into respective videotapes is accomplished as follows with reference to FIGS. 3 and 4. A trigger signal from computer 320 starts the VTR units 310 into play. Accordingly, the videotapes within VTR units 310 advance within the pre-roll black portion 410 and reach the reference mark 420 at which point a DTMF tone may be detected, via VTR control line 365 by respective VTR control cards 360 associated with each VTR unit 310.

Upon detection of the DTMF reference mark 420 for each VTR unit 310, a counter, not shown, associated with the respective VTR control card 360 is loaded with a value corresponding to the time required to advance the VTR unit 310, e.g., in fast forward mode, from reference mark 420 to the desired insertion point (identified as "a" in FIG. 4) at the beginning of the custom audio insertion area 440. Counter operation is then commenced in conjunction with the sending of a signal to by the respective VTR control card 360, via VTR control line 365, to its associated VTR unit 310 which places that VTR unit into fast forward operating mode.

Countdown of the counter associated with VTR control card 360 causes another signal to be sent by control card 360, via control line 365, to its respective VTR unit 310 which stops VTR operation. At this time, videotape 400 is positioned at the insertion point (identified as "a" in FIG. 4) for the audio segment. The counter associated with VTR control card 360 is then loaded with a value corresponding to the time required to insert the respective audio segment into the corresponding videotape (e.g., based on time duration of the individualized audio segment to be inserted). VTR unit 310 is then placed into play and audio dub mode, via control signal sent by VTR control card 360 along control line 365, and a trigger signal is sent to an Audio Insertion Unit (AIU) associated with computer 320 which causes the audio segments to be sent, via audio signal lines 345, from audio server cards 340.

When the counter reaches zero, VTR unit 310 is stopped, via signal from VTR control card 360 along VTR control line 365, audio segment insertion has been completed, and the videotape 400 is positioned at the end (identified as "b" in FIG. 4) of the custom audio insertion area 440. A signal may then be sent from VTR control card 360, via control line 365, which causes VTR unit to rewind and/or eject the videotape loaded therein.

While operation of the VTR units in fast forward mode may effect time savings in the insertion process, such operation, as previously detailed with respect to the preferred embodiment, is not necessary to the operation according to this alternate embodiment. Accordingly, VTR units could be advanced to the custom insertion area 440 from the reference mark 420 at normal play speed. In such case, the aforementioned counter would be set to a "real time" value required for videotape 400 to traverse such distance.

Further alternative embodiments of the present method and system, directed to differing video media other than analog videotape, are envisioned and intended to be within the scope of the disclosure herein and the claims appended hereto. As identified previously, other video media, including digital videocassette, recordable compact disk video, and the like, provide alternative media through which video and audio information may be disseminated to individuals or entities. As with their analog videotape counterpart, these alternative media suffer from similar cost disadvantages with respect to their use in low-volume or individualized applications. The present method and system, however, may readily be adapted to these media as well in order to provide for the personalization of pluralities of units of such media (i.e., videocassette, disks, etc.).

Accordingly, in another embodiment, the method and system herein may be adapted for use with digital videocassette recorder units (DVCR units). According to such an embodiment, a voice recording and data entry subsystem 10 as depicted in FIG. 1a may be utilized to accumulate audio segments as previously detailed. A production control center subsystem similar to subsystem 20 as shown in FIG. 1b may be incorporated, with slight modification as indicated below, in order to insert audio segments into respective prerecorded digital videocassette.

A first modification to the production control center subsystem results from the fact that the videocassette to be personalized comprise digital audio and video information. Accordingly, the digital to analog conversion operation required with respect to the preferred embodiment detailed above is obviated. However, as the format for the digital information incorporated into the digital videocassette may likely differ from the digitized format used for storage of audio segments, a digital to digital conversion operation may be required. Such operation would be implemented in order to convert a digital bit stream, comprising audio segment information to be inserted, into a digital bit stream format which may be accepted by a respective DVCR unit for insertion into a prerecorded digital videocassette.

Another modification to the production control center subsystem 20 as shown in FIG. 1 results from differences in the manner in which particular frames may be identified for purposes of locating an insertion position for individualized audio segments with respect to a digital videocassette. In this regard, it is envisioned that neither the vertical interval time code nor the longitudinal time code format, as presently utilized with respect to analog videotapes, would be utilized to identify positions with respect to digital videocassette recorders and corresponding videocassette. Accordingly, use of the time code translators 110 (as shown in FIG. 1b) would be obviated. Alternatively, identification of insertion position(s) in a DVCR system may be accomplished by entry, into computer 70, of an absolute position which may correspond to absolute position information incorporated into the digital bit stream associated with each prerecorded digital videocassette.

Further, communication with respective digital VCR units by control cards (such as control cards 95 in FIG. 1b) would similarly be accomplished in the form of digital bit stream information formatted in accordance with specifications attendant with a particular make of digital VCR. Such digital bit stream information would control the operation of respective digital VCR units in a manner similar to that previously described with respect to the production control center as shown in FIG. 1b. Accordingly, an insertion position would be located with respect to each digital videocassette loaded into respective DVCR units and digital bit streams, each comprising an individualized audio segment, would be transferred to respective ones of a plurality of DVCR units connected with the system, and, accordingly, inserted into respective digital videocassette loaded therein.

Having described the invention in detail and by reference to preferred embodiments thereof, it will be apparent that other modifications and variations are possible without departing from the spirit and scope of the invention defined in the appended claims.

What is claimed is:

1. A method for personalizing a plurality of prerecorded videotapes, each prerecorded videotape having an audio track, comprising the steps of:
   accumulating a plurality of individualized audio segments; and,
   simultaneously inserting each of said individualized audio segments into the audio track of respective prerecorded videotapes.

2. A method for personalizing a plurality of prerecorded videotapes comprising the steps of:
   accumulating a plurality of individualized audio segments, said accumulating step further comprising the steps of:
      receiving a signal comprising at least one audio segment;
      uniquely identifying each of said at least one audio segments comprising said signal; and,
      storing said uniquely identified audio segments; and,
   simultaneously inserting each of said audio segments into respective prerecorded videotapes.

3. The method according to claim 2 wherein:
   said signal received comprises an analog signal;
   said uniquely identified audio segments are digitized prior to said storing step;
   said audio segments are uniquely identified by associating unique identification data with each of said audio segments, respectively; and,
   said step of storing said uniquely identified audio segments further comprises the step of storing said unique identification data together with said uniquely identified audio segment with which it is associated.

4. A method for personalizing a plurality of prerecorded videotapes comprising the steps of:
   accumulating a plurality of individualized audio segments, said accumulating step further comprising the steps of:
      receiving data uniquely identifying an individualized audio segment;
      receiving an analog signal comprising said individualized audio segment;
      digitizing said individualized audio segment comprising said analog signal received; and,
      storing said identifying data and said digitized audio segment; and
   simultaneously inserting each of said audio segments into respective prerecorded videotapes.

5. The method according to claim 4 wherein said analog signal is received through a microphone and further comprising the steps of:
   mixing and filtering said analog signal; and,
   compressing said analog signal prior to said digitizing step.

6. The method according to claim 2 wherein said identifying data and said digitized individualized audio segment are stored together digitally on a data tape.

7. The method according to claim 2 wherein said analog signal is received from a prerecorded audio medium.

8. The method according to claim 2 wherein each of said at least one audio segments are uniquely identified by the step of generating identification data associated therewith, respectively.

9. The method according to claim 4 wherein said data uniquely identifying an individualized audio segment is received via a keyboard connected to a computer.

10. A method for personalizing a plurality of prerecorded videotapes comprising the steps of:
    accumulating a plurality of individualized audio segments; and,
    simultaneously inserting each of said audio segments into respective prerecorded videotapes, said simultaneously inserting step further comprising the steps of:
       advancing each of said prerecorded videotapes, respectively, to a predefined position; and,
       dubbing each of said individualized audio segments into an audio track of said respective prerecorded videotapes.

11. A method for personalizing a plurality of prerecorded videotapes comprising the steps of:
    accumulating a plurality of individualized audio segments; and,
    simultaneously inserting each of said audio segments into respective prerecorded videotapes, said simultaneously inserting step further comprising the steps of:
       associating each audio segment with one of a plurality of videotape recorders, respectively, each of said plurality of videotape recorders having identification information associated therewith and each having one of said plurality of prerecorded videotapes loaded therein;
       identifying, for each of said audio segments, a position with respect to each of said plurality of prerecorded videotapes at which said audio segment is to be inserted;
       independently controlling each of said plurality of videotape recorders so as to locate said identified position with respect to each of said plurality of prerecorded videotapes; and
       transferring each audio segment, respectively, to said videotape recorder with which it is associated while further independently controlling each of said plurality of videotape recorders to effect audio dubbing, whereby each of said audio segments is simultaneously inserted into said respective prerecorded videotapes at said identified position.

12. The method of claim 11 further comprising the steps of:
    identifying data associated with each of said audio segments, respectively;
    maintaining, for each audio segment, correspondence between said audio segment, said identified data associated with said audio segment, and said identification information associated with said respective videotape recorder with which said audio segment is associated; and,
    printing, for each audio segment, a label comprising said associated data and said identification information associated with said respective videotape recorder with which said audio segment is associated.

13. The method of claim 11 wherein said audio segments are inserted at a predefined position.

14. The method of claim 13 wherein said predefined position is the same for all respective videotapes.

15. The method of claim 11 wherein time code information, as encoded into each of said plurality of videotapes, is utilized as a basis for identifying and locating said position at which said audio segment is to be inserted.

16. The method according to claim 15 wherein said time code information comprises vertical interval time code information.

17. The method according to claim 15 wherein said time code information comprises longitudinal time code information.

18. The method according to claim 11 wherein a counter is utilized as a basis for identifying and locating said position at which said audio segment is to be inserted.

19. The method according to claim 18 wherein a reference mark is provided at a known reference position within each of said plurality of prerecorded videotapes, said counter is started upon detection of said reference mark, and said position at which said audio segment is to be inserted is located upon the counter reaching a predefined value.

20. The method according to claim 19 wherein said known reference position at which said reference mark is provided occurs in a pre-roll black portion of each of said plurality of prerecorded videotapes and said reference mark comprises an audible tone.

21. The method according to claim 19 wherein said counter is set to a time value which corresponds to a time required for each of said prerecorded videotapes, respectively, to reach said position at which said individualized audio segment is to be inserted from said known reference position at which said reference mark is provided.

22. A system for personalizing a plurality of prerecorded videotapes, each prerecorded videotape having an audio track, comprising:

means for accumulating a plurality of individualized audio segments; and, means for inserting each individualized audio segment into the audio track of one of said plurality of prerecorded videotapes, respectively, at a predefined position.

23. A system for personalizing a plurality of prerecorded videotapes, comprising:

means for accumulating a plurality of individualized audio segments, said means for accumulating further comprising:

a microphone, said microphone providing an analog signal comprising an audio segment to be accumulated;

a mixer, said mixer receiving said analog signal from said microphone;

an audio filter disposed at the output of said mixer and providing a filtered analog audio signal; and, a computer, which receives said filtered analog audio signal from said audio filter; and, means for inserting each audio segment into one of said plurality of prerecorded videotapes, respectively, at a predefined position.

24. The system of claim 23 wherein said audio segments accumulated comprise digital signals and wherein said computer includes an analog to digital converter for converting said filtered analog audio signal to a digital signal, and said computer further includes a digital tape storage drive in which said audio segments are accumulated.

25. A system for personalizing a plurality of prerecorded videotapes, comprising:

means for accumulating a plurality of individualized audio segments; and, means for inserting each audio segment into one of said plurality of prerecorded videotapes, respectively, at a predefined position, said means for inserting further comprising:

a computer, said computer providing a plurality of analog signals, each of said analog signals comprising one of said audio segments to be inserted;

a plurality of videotape recorders, each of said videotape recorders having one of said plurality of videotapes loaded therein;

an audio filter interposed between said computer and each of said videotape recorders, said audio filter providing independent filtering of said analog signals; and, means for controlling said plurality of videotape recorders, said means for controlling interposed between said computer and said plurality of videotape recorders, and said means for controlling providing independent control of respective videotape recorders so as to effect the insertion of said audio segments at said predefined position.

26. In a system for inserting an audio segment into prerecorded videotapes, a method of accumulating audio segments, comprising:

(a) receiving data uniquely identifying an audio segment to be received;

(b) receiving an analog signal comprising said audio segment;

(c) digitizing said analog signal;

(d) storing said data uniquely identifying said audio segment and said digitized audio segment; and, repeating steps (a) through (d) until all of said audio segments have been accumulated.

27. The method of claim 26 wherein the step of digitizing said analog signal further comprises the steps of:

filtering said received analog signal comprising said audio segment; and, compressing said filtered analog signal.

28. A method for simultaneously inserting individualized audio segments into respective prerecorded videotapes, each prerecorded videotape having an audio track, comprising the steps of:

receiving a group of individualized audio segments;

associating each of said individualized audio segments with one of a plurality of videotape recorders, respectively;

defining a position, with respect to each of a plurality of prerecorded videotapes, at which a respective one of said individualized audio segments is to be inserted into a respective one of said prerecorded videotapes;

independently controlling each of said plurality of videotape recorders, each of said plurality of videotape recorders having a respective one of said prerecorded videotapes loaded therein, so as to locate said defined position with respect to each of said plurality of prerecorded videotapes; and transferring each of said individualized audio segments, respectively, to said videotape recorder with which it is associated, while further independently controlling each of said plurality of videotape recorders to effect audio dubbing, whereby each of said individualized audio segments is simultaneously inserted into the audio track of said respective prerecorded videotapes at said defined position.

29. A method for simultaneously inserting individualized audio segments into respective prerecorded videotapes comprising the steps of:

receiving a group of individualized audio segments:

associating each of said individualized audio segments with one of a plurality of videotape recorders, respectively;

defining a position, with respect to each of a plurality of prerecorded videotapes, at which a respective one of said individualized audio segments is to be inserted into a respective one of said prerecorded videotapes;

independently controlling each of said plurality of videotape recorders, each of said plurality of videotape recorders having respective one of said prerecorded videotapes loaded therein, so as to locate said defined position with respect to each of said plurality of prerecorded videotapes;

transferring each of said individualized audio segments, respectively, to said videotape recorder with which it is associated, while further independently controlling each of said plurality of videotape recorders to effect audio dubbing, whereby each of said audio segments is simultaneously inserted into said respective prerecorded videotapes at said defined position;

keeping track of which of said plurality of videotape recorders each of said prerecorded videotapes, respectively, is loaded into and which of plurality of videotape recorders each of said individualized audio segments, respectively, is transferred to for insertion into said respective prerecorded videotape; and, printing a label for each of said prerecorded videotapes which includes information regarding the videotape recorder into which said prerecorded videotape is loaded and which of said individualized audio segments is associated therewith.

30. A method for personalizing one or more prerecorded videotapes with an audio segment, each prerecorded videotape having an audio track, comprising the steps of:

receiving an analog signal comprising at least one audio segment;

digitizing said analog signal;

storing said digitized signal along with associated data particularly identifying each of said at least one audio segments;

retrieving at least one of said stored, digitized audio segments and said data associated therewith;

associating each of said retrieved audio segments, and said data associated therewith, with a particular one of said prerecorded videotapes into which said audio segment may be inserted;

identifying a position with respect to each of said one or more prerecorded videotapes at which a respectively different one of said at least one audio segments is to be inserted;

controlling one or more video tape recorders, each having one of said one or more prerecorded videotapes loaded therein, so as to locate said identified position with respect to each of said one or more videotapes; and, simultaneously inserting each of said audio segments, respectively, into the audio track of said particular one of said one or more prerecorded videotapes with which it has been associated at said position identified with respect to each of said one or more videotapes.

31. A method for personalizing one or more prerecorded videotapes with an audio segment, comprising the steps of:

receiving an analog signal comprising at least one audio segment;

digitizing said analog signal;

storing said digitized signal along with associated data particularly identifying each of said at least one audio segments;

retrieving at least one of said stored, digitized audio segments and said data associated therewith;

associating each of said retrieved audio segments, and said data associated therewith, with a particular one of said prerecorded videotapes into which said audio segment may be inserted;

identifying a position with respect to each of said one or more prerecorded videotapes at which a respectively different one of said at least one audio segments is to be inserted;

controlling one or more video tape recorders, each having one of said one or more prerecorded videotapes loaded therein, so as to locate said identified position with respect to each of said one or more videotapes;

simultaneously inserting each of said audio segments, respectively, into said particular one of said one or more prerecorded videotapes with which it has been associated at said position identified with respect to each of said one or more videotapes; and, wherein said videotape recorders comprise digital videocassette recorders and wherein said prerecorded videotapes comprise digital videocassettes.

32. A method for personalizing one or more prerecorded videotapes with an audio segment, comprising the steps of:

receiving an analog signal comprising at least one audio segment;

digitizing said analog signal;

storing said digitized signal along with associated data particularly identifying each of said at least one audio segments;

retrieving at least one of said stored, digitized audio segments and said data associated therewith;

associating each of said retrieved audio segments, and said data associated therewith, with a particular one of said prerecorded videotapes into which said audio segment may be inserted;

identifying a position with respect to each of said one or more prerecorded videotapes at which a respectively different one of said at least one audio segments is to be inserted;

controlling one or more video tape recorders, each having one of said one or more prerecorded videotapes loaded therein, so as to locate said identified position with respect to each of said one or more videotapes;

simultaneously inserting each of said audio segments, respectively, into said particular one of said one or more prerecorded videotapes with which it has been associated at said position identified with respect to each of said one or more videotapes;

maintaining, for each of said audio segments, the correspondence between said audio segment, said identification data associated therewith, and a particular one of said one or more videotapes into which said audio segment has been inserted; and, printing a label comprising said identification data associated with said audio segment inserted into said particular one of said one or more prerecorded videotapes, said label further comprising information indicating into which of said prerecorded videotapes said audio segment has been inserted.

33. A system for dubbing audio segments over existing audio information at a predefined position within a plurality of prerecorded videotapes, respectively, comprising:

means for receiving one or more analog signals, each of said analog signals comprising at least one personalized audio message segment;

means for uniquely identifying each of said audio message segments by the association of identification data therewith;

means for interposing said audio message segments and said associated identification data; and means for storing said interposed audio message segments and associated identification data.

34. The system of claim 33 wherein said means for receiving further comprises means for recording said one or more analog signals.

* * * * *